(12) United States Patent
Kass

(10) Patent No.: US 11,023,489 B2
(45) Date of Patent: Jun. 1, 2021

(54) ASSET REGISTRATION AND DETECTION SYSTEM WITH CLOSED-LOOP FEEDBACK CHANNEL

(71) Applicant: Accenture Global Solutions Limited, Dublin (IE)

(72) Inventor: Alex Kass, Palo Alto, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 719 days.

(21) Appl. No.: 15/720,569

(22) Filed: Sep. 29, 2017

(65) Prior Publication Data
US 2019/0102444 A1     Apr. 4, 2019

(51) Int. Cl.
| | |
|---|---|
| G06Q 20/06 | (2012.01) |
| H04L 29/08 | (2006.01) |
| G06F 3/048 | (2013.01) |
| G06F 16/27 | (2019.01) |
| G06Q 10/06 | (2012.01) |
| G06F 16/242 | (2019.01) |

(52) U.S. Cl.
CPC .......... *G06F 16/27* (2019.01); *G06F 16/2423* (2019.01); *G06Q 10/06* (2013.01); *G06Q 20/06* (2013.01); *H04L 67/306* (2013.01); *G06F 3/048* (2013.01); *H04L 67/02* (2013.01)

(58) Field of Classification Search
CPC ...... G06F 16/27; G06F 16/2423; G06F 3/048; H04L 67/306; H04L 67/02; G06Q 20/06; G06Q 10/06
See application file for complete search history.

(56) References Cited

U.S. PATENT DOCUMENTS

| | | | |
|---|---|---|---|
| 2009/0292643 A1* | 11/2009 | Wu ...................... | G06Q 50/188 705/80 |
| 2014/0208239 A1* | 7/2014 | Barker .................. | G06Q 50/01 715/757 |
| 2015/0100570 A1* | 4/2015 | Zent ...................... | G06F 16/334 707/723 |

\* cited by examiner

*Primary Examiner* — Charles D Adams
(74) *Attorney, Agent, or Firm* — Brinks Gilson & Lione

(57) ABSTRACT

An asset tracking system helps an enterprise correctly and efficiently determine when assets are created and when they are re-used. Re-use of assets often creates a positive impact, e.g., on other projects ongoing within the enterprise. The system detects the asset re-use, determines the asset impact, and automatically updates a dynamic profile of the asset creator to register the value of their work. In some implementations, the system implements a virtual currency system that also rewards the supervisors of the asset creator, and allows the virtual currency to be exchanged for project resources needed by the supervisors.

20 Claims, 7 Drawing Sheets

ASSET REGISTRATION AND DETECTION SYSTEM WITH CLOSED-LOOP FEEDBACK CHANNEL

TECHNICAL FIELD

This application relates to digital assets. This application also relates to registering digital assets and detecting the use of the assets.

BACKGROUND

Most enterprises employ many potential asset creators. As just one example, a database design company may employ many software developers who generate new or modified assets each day. Some examples of the assets include source code, function libraries, and software architecture specifications. Improvements in registering and detecting assets within the enterprise will help deliver significant enterprise-wide benefits.

DETAILED DESCRIPTION

Figure 1:
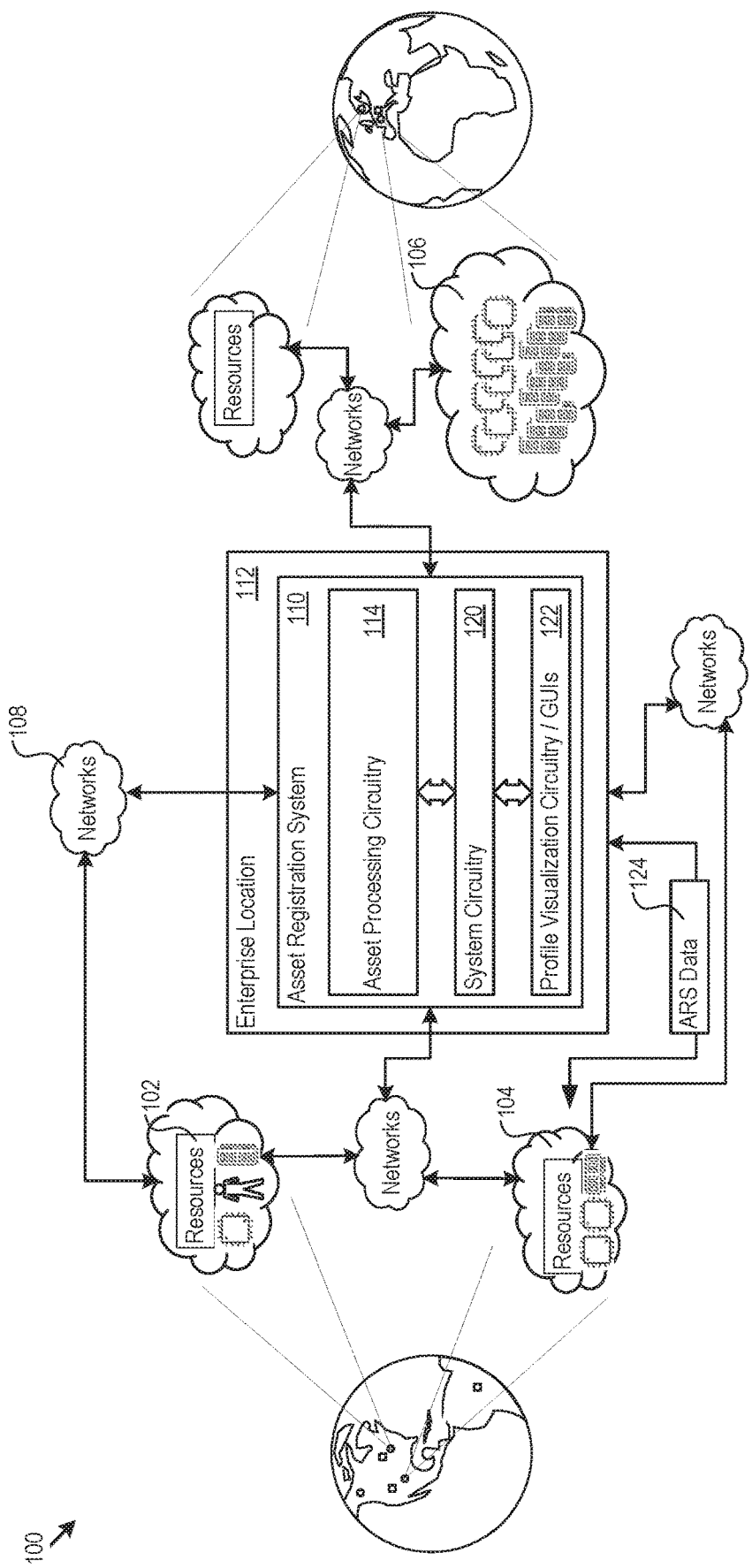
FIG. 1 shows a networked environment in which the asset registration system ("ARS") operates.

Efficiently and correctly determining the assets that exist, are created, and are used and re-used within an enterprise with sufficient granularity is a significant technical challenge. In most enterprises, there are many potential asset creators, e.g., software developers, who might be generating new or modified assets, e.g., function calls and code libraries, every day. A still further technical challenge is detecting when the assets are used and re-used within the enterprise, as well as determining the impact the asset has had. Further technical challenges exist in automatically building creator profiles that provide a view of the technical abilities and work product of the asset creators and the success of their assets.

Assets span an immense range of form, function, and purpose, and as just a few examples include software development artifacts such as source code, function libraries, and software architecture documents; word processing, spreadsheet, and presentation program templates; and business documents such as market research reports, sales presentations, project-plan templates, and estimation models. In any particular implementation of the system described below, an asset may have different levels of granularity, and may for instance correspond to any pre-determined unit of work that the system desired to rack. As examples, an asset may correspond to a single digital file, e.g., a source code file for a voice recognition algorithm or a presentation on sales results for a particular enterprise division; a collection of files, e.g., a driverless car software library including the voice recognition algorithm, or a company wide sales performance report; or a subset of content within a file, e.g., a Fast Fourier Transform calculation within the voice recognition algorithm, or a particular graphic present in the presentation on sales results. Accordingly, assets from multiple content creators may be present in a single document or file, and the system described below may track assets and any pre-configured level of granularity.

An asset registration system ("ARS") provides technical solutions to problems mentioned above. Among other functions, the ARS registers created assets and the asset creator. Use and re-use causes the asset to have a measureable asset impact, e.g., speeding the development of new products with fewer technical problems and assigning credit to the creators. In the ARS, the asset impact determines in part how creator profiles are dynamically updated and maintained, while reward rulesets may determine how a manager or supervisor of the asset creator is recognized for the contributions of the asset creator.

As will be described in more detail below, the ARS helps solve the technical problem of a live portfolio of asset impact by assets generated by specific asset creators. In that regard, the ARS creates and maintains: 1) up to date, 2) accurate, and 3) fine grained profiles of individual asset creators. In dynamically updating creator profiles, the ARS may, as examples, detect asset topics and add skills or increment skill levels and track data points such as number of asset uses or re-uses, and the asset impact measured in terms of cost savings, time savings, speed to market, number of new products or other pre-defined metric. One benefit of the live portfolio is that it provides an improved view of the asset creator skills and contributions, and facilitates improved matching of the asset creator to new enterprise projects due to the improved accuracy and timeliness of the live portfolio view.

The technical improvements achieved via the live portfolio make a significant impact in evolving resource allocation techniques, e.g., crowd sourcing. With the new techniques, a resource is more likely to perform many smaller projects for many more supervisors. It is less likely that any single supervisor will know all of the contributions because there are more contributions, and they are performed for more people. The ARS generates live portfolio profile visualizations that allow individual supervisors to understand the skills and impact attributable to any given resource.

The ARS also supports virtual currency (VC) rewards through an underlying data storage layer, e.g., a blockchain, to maintain transaction history. In this regard, the ARS allocates credit to supervisors of individual resources that create assets. Credit may flow responsive according to any pre-define reward ruleset, such as a fixed amount of VC per hour or per project based on resource and project. In other implementations, the rulesets define VC rewards responsive to ongoing assortment of asset impact, and as an asset continues to create additional value (e.g., for each re-use of a code library), the ARS may allocate additional VC to the supervisor. The ARS supports the exchange of VC by one supervisor needing help on a project to temporarily obtain resources assigned to another supervisor for that project. As such, the VC provides incentive to the supervisors to make their resources available to other supervisors.

Figure 2:
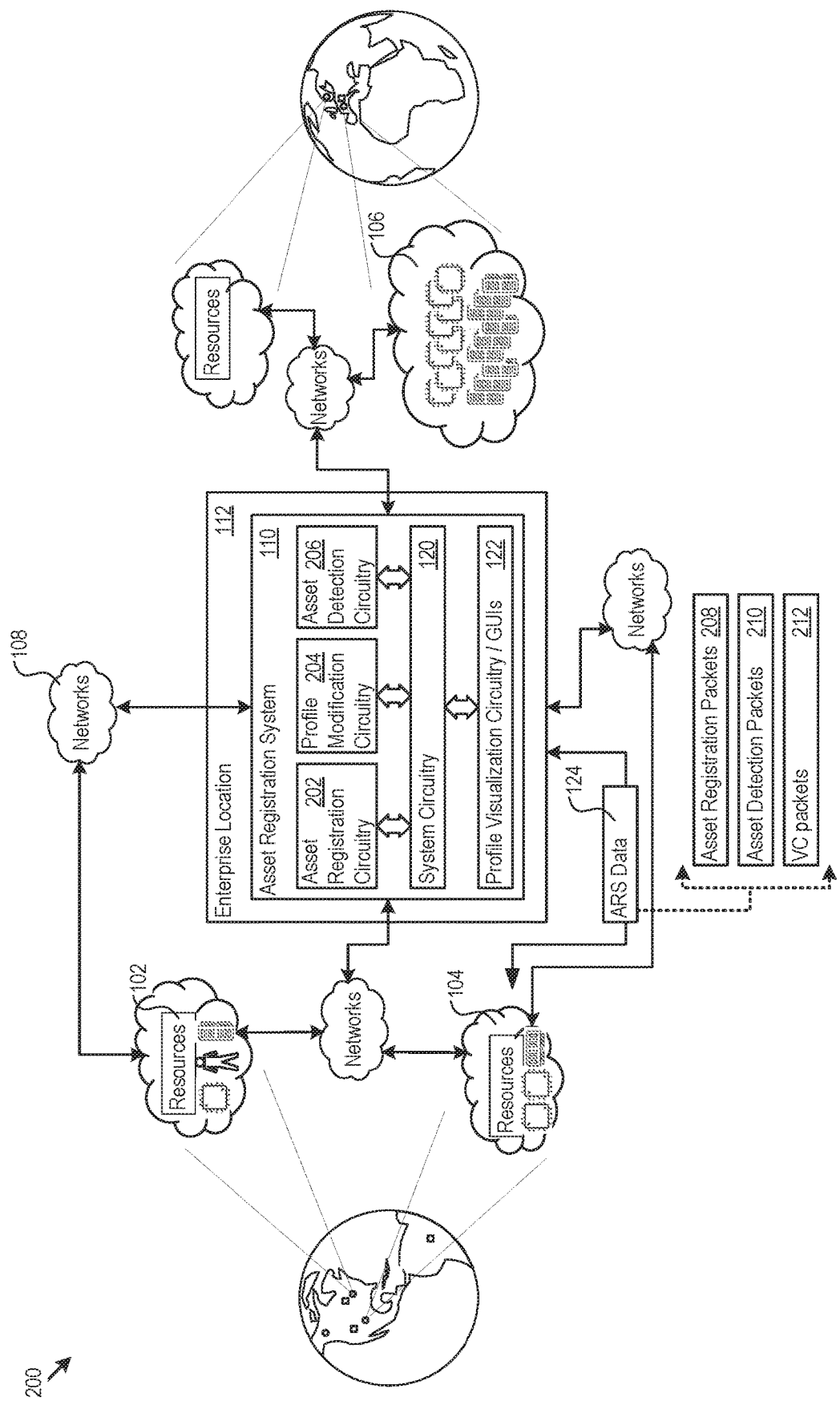
FIG. 2 shows additional detail of the ARS.

FIGS. 1 and 2 provide an example context for the discussion below of the technical solutions in the ARS. The examples in FIGS. 1 and 2 show one of many possible different implementation contexts. In that respect, the technical solutions are not limited in their application to the architectures and systems shown in FIGS. 1 and 2, but are applicable to many other system implementations, architectures, and connectivity.

FIG. 1 shows a global network architecture 100. Connected through the global network architecture 100 are resources, e.g., the resources 102, 104, and 106. These resources may be present at many different resource sites globally, e.g., enterprise office locations. Resources may correspond to any element of project execution, whether specific individuals (e.g., a GUI programmer), hardware resources (e.g., CPU, memory and disk resources), or software resources (e.g., algorithm or function packages, application software, operating systems, or database management systems). Throughout the global network architecture 100 are networks, e.g., the network 108. The networks provide connectivity between the resource sites, the resources, the ARS and other globally positioned entities. The networks may include private and public networks defined over any pre-determined and possibly dynamic internet protocol (IP) address ranges.

An ARS 110 is hosted at an enterprise location 112. The enterprise location 112 acts as a centralized implementation and control point for the ARS 110. The enterprise location 112 may be implemented in an on-premise server, for instance, or an in a virtual machine hosted in a cloud environment for the enterprise. The ARS 110 includes asset processing circuitry 114 that will be described in more detail below. The system circuitry 120 coordinates the operation and processing flow of the asset processing circuitry 114. In addition, the system circuitry 120 drives profile visualization circuitry 122 that implements a set of graphical user interfaces (GUIs) that generate live profile visualizations and transmission. The resources 102-106, resource sites and the ARS 110 exchange ARS data 124.

FIG. 2 shows an expanded view 200 of the ARS 110. In this example implementation, the ARS 110 includes asset registration circuitry 202, profile modification circuitry 204, and asset detection circuitry 206. The system circuitry 120 coordinates the operation and interactions among the asset registration circuitry 202, profile modification circuitry 204, and asset detection circuitry 206.

The ARS data 124 conveys information about assets and their use and re-use that the circuitry 202-206 analyzes and processes. Examples of ARS data 124 include asset registration packets 208 received through a registration connection implemented in the ARS 110. As just one example, an asset registration packet may include an asset identifier of a specific asset and a creator identifier of a specific creator of the specific asset. Another example of ARS data 124 includes asset detection packets 210 received through an asset detection interface implemented in the ARS 110. The asset detection packets may include impact indicators for the specific asset, for instance. Yet another example of ARS data 124 is a VC packet 212. The VC packet may specify a VC award and recipient, e.g., the supervisor of the specific creator. The role of the asset data 124 is explained further below, and may vary widely depending on the implementation of the ARS 110.

The asset registration circuitry 202 is configured to implement an asset registration interface over a physical layer communication interface, e.g., as SOAP, WSDL or REST Web services interfaces or other types of exposed application programming interfaces (APIs) on top of an Ethernet or WiFi physical layer. The asset registration circuitry 202 receives an asset registration packet through the asset registration interface, e.g., including an asset identifier of a specific asset and a creator identifier of a specific creator of the specific asset. In an asset registration database, the asset registration circuitry 202 maintains an asset registration record for the specific asset, including, e.g., the asset identifier and the creator identifier.

The asset detection circuitry 206 is configured to implement an asset detection interface over the physical layer communication interface. The asset detection circuitry 206 receives asset detection packets through the asset detection interface, including e.g., usage data for the specific asset. In an asset manipulation database, the asset detection circuitry 206 maintains an asset utilization record updated with the usage data for the specific asset.

The profile modification circuitry 204 is configured to analyze the usage data to determine a profile update for the specific creator. In a profile database, the profile modification circuitry 204 automatically maintains a profile record for the specific creator, dynamically updated responsive to the profile update.

Figure 3:
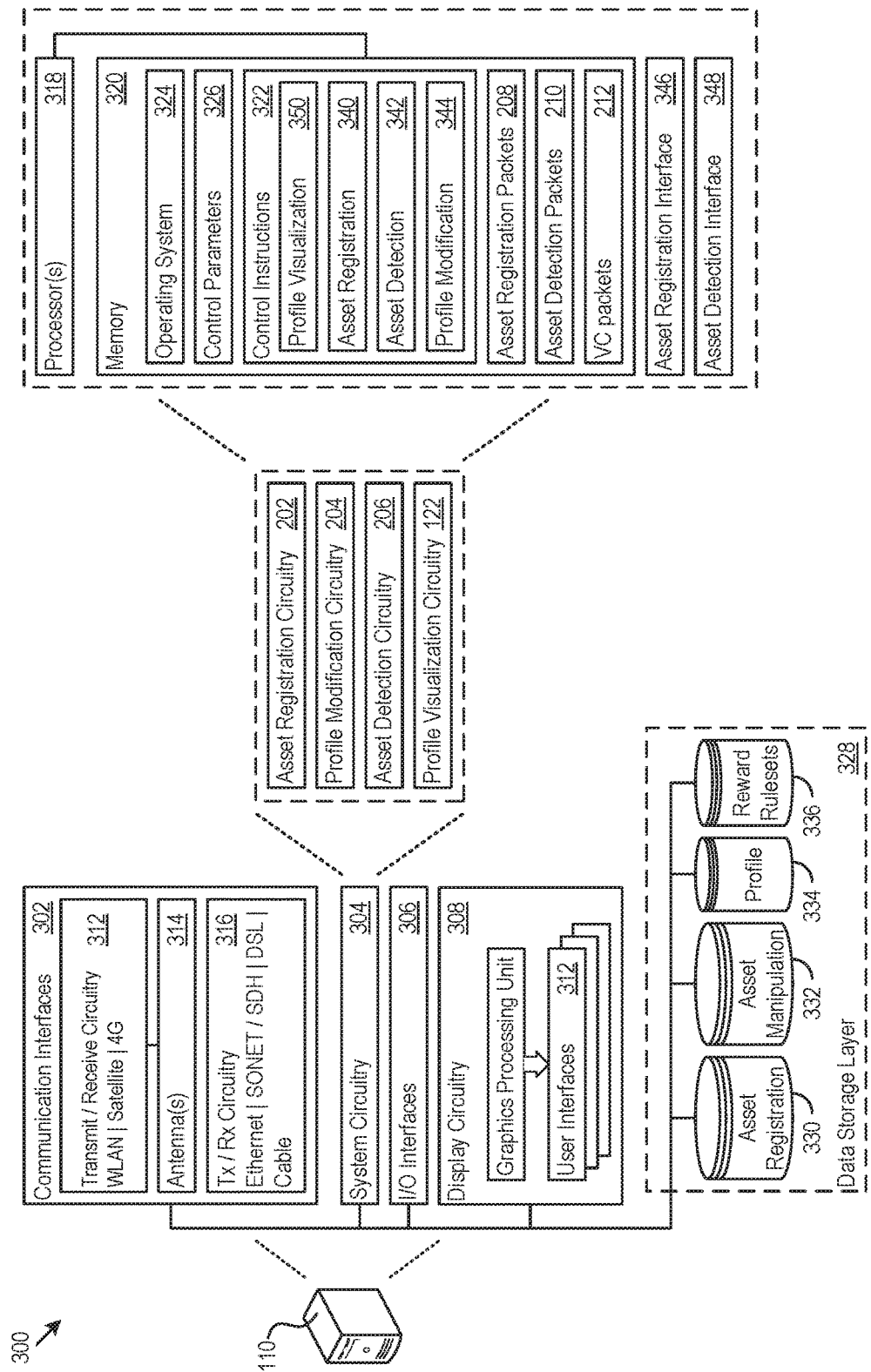
FIG. 3 shows an example implementation of the ARS.
Figure 4:
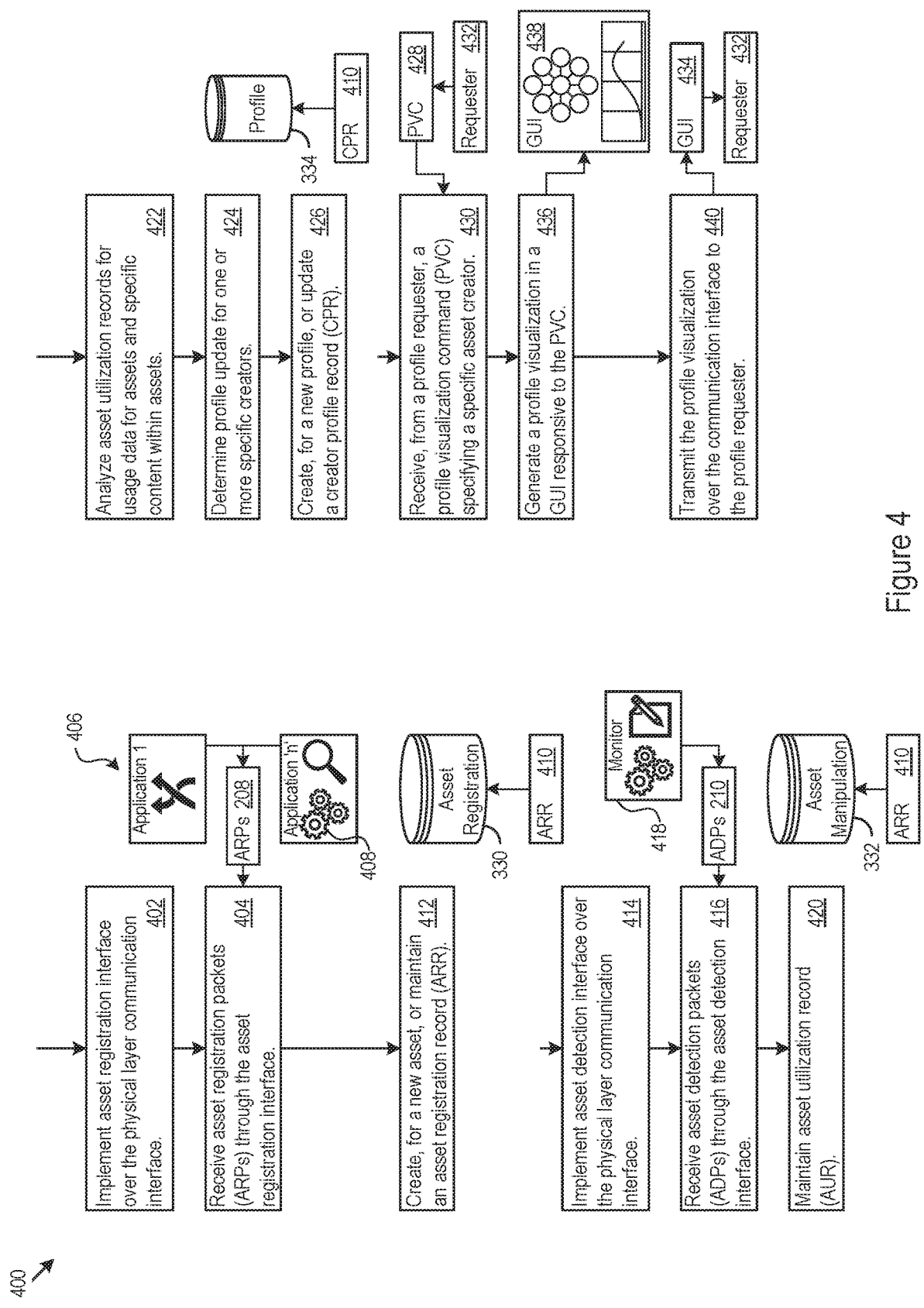
FIG. 4 shows logic that the ARS may implement.

FIGS. 3 and 4 are discussed together below, and show an example hardware and logical processing implementation 300 of the ARS 110. The ARS 110 includes communication interfaces 302, system circuitry 304, input/output (I/O) interfaces 306, and display circuitry 308. The profile visualization instructions 350 generate user interfaces (UIs) for local display using the display circuitry 308, or for remote display, e.g., as HTML/Java output transmitted over the communication interfaces 302 for a web browser running on a local or remote machine. Among other interface features, the UIs 310 deliver profile visualizations to an operator. The profile visualizations include, e.g., dynamically updating profile records for any selected asset creator. The UIs 310 and the I/O interfaces 306 may include graphical user interfaces (GUIs), touch sensitive displays, voice or facial recognition inputs, buttons, switches, speakers and other user interface elements. Additional examples of the I/O interfaces 306 include microphones, video and still image cameras, headset and microphone input/output jacks, Universal Serial Bus (USB) connectors, memory card slots, and other types of inputs. The I/O interfaces 306 may further include magnetic or optical media interfaces (e.g., a CDROM or DVD drive), serial and parallel bus interfaces, and keyboard and mouse interfaces.

The communication interfaces 302 may include wireless transmitters and receivers ("transceivers") 312 and any antennas 314 used by the transmit and receive circuitry of the transceivers 312. The transceivers 312 and antennas 314 may support WiFi network communications, for instance, under any version of IEEE 802.11, e.g., 802.11n or 802.11ac. The communication interfaces 302 may also include physical medium transceivers 316. The physical medium transceivers 316 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 304 may include any combination of hardware, software, firmware, or other circuitry. The system circuitry 304 may be implemented, for example, with one or more systems on a chip (SoC), application specific integrated circuits (ASIC), microprocessors, discrete analog and digital circuits, and other circuitry. The system circuitry 304 is part of the implementation of any desired functionality in the ARS 110, and may encompass the asset registration circuitry 202, profile modification circuitry 204, asset detection circuitry 206, and other system features.

As just one example, the system circuitry 304 may include one or more instruction processors 318 and memories 320. The memory 320 stores, for example, control instructions 322 and an operating system 324. In one implementation, the processor 318 executes the control instructions 322 and the operating system 324 to carry out any desired functionality for the ARS 110. The control parameters 326 provide and specify configuration and operating options for the control instructions 322, operating system 324, and other functionality of the ARS 110.

The ARS 110 may include any number of data storage layers 328, e.g., arrays of disk drives or other memory systems. The data storage layers 328 provide the underlying storage for any number of databases that the control instructions 322 access, e.g., through a database control system, to perform the functionality implemented in the control instructions 322, including the functionalities described below for asset registration, profile modification, asset detection, profile visualization, and asset allocation.

In the example shown in FIG. 3, the databases include an asset registration database 330, an asset manipulation database 332, and a profile database 334. The control instructions 322 drive the functionality of the ARS 110. In that regard, the control instructions 322 include asset registration instructions 340, asset detection instructions 342, and profile modification instructions 344. FIG. 4 shows an example of corresponding logic that the ARS 110 system may implement, e.g., in the control instructions 322.

As an initial matter, any particular implementation may support asset detection at different levels. In one implementation, a central repository stores the assets and therefore plays a central role in tracking the assets within the enterprise. Other implementations include distributed asset storage. For instance, one or more individual employee workstations may store assets. As noted below, for distributed asset storage, the ARS 110 may include workstations on which are installed modified versions of content creation applications. The modified applications may include patches or plugins that perform asset detection and reporting. In scenarios in which the applications cannot be modified, the workstations may execute a separate asset reporting service. The asset reporting service may be configured to scan the workstation storage devices for new or modified assets, for instance. The scan may run periodically, in response to execution of content creation applications, in response to disk access, or in response to operation command or direction, as examples. Accordingly, while one particular example is presented below, the ARS 110 may work in other contexts anywhere along the spectrum of fully centralized to completely distributed.

As noted above, the asset registration instructions 340 implement an asset registration interface 346 over a physical layer communication interface (402). The asset registration 346 interface receives asset registration packets through the asset registration interface (404). The asset registration packets include, e.g., an asset identifier of a specific asset, e.g., an asset pointer to a specific asset within a digital file and a creator identifier of a specific creator of the specific asset. The asset identifier may take the form, as examples of metadata attached to the application project file, or embedded asset pointers within the project file (e.g., a pointer to a graphic in the project file and created for the project). In some implementations, e.g., with distributed asset storage, asset creation tools 406 or asset creation plugins 408 transmit the asset creation packets. For instance, a word processor, spreadsheet application, or presentation editor application (or a plugin module for such as application) may transmit the asset registration packets. These applications and plugins may transmit the asset creation packets when an asset creator has created and saved a new asset or modified an existing asset using the application, as examples. In the asset registration database 330, the asset registration instructions 340 create (if a new asset) or maintain an asset registration record 410 for the specific asset (412). As examples, the asset registration record 410 may store the asset identifier, the creator identifier for the specific asset, creation date/time, creation location, and other asset creation characteristics.

The asset detection instructions 342 implement an asset detection interface 348 over the physical layer communication interface (414). The asset detection interface 348 receives asset detection packets (416) from asset use monitors 418. The asset use monitor may be any content creation application, network traffic filter, manual reporting submission, database storage layer, or other element that recognizes assets (e.g., by comparison to registered assets, asset digests, or hashes of registered assets in the asset registration database 330), and reports the use of the asset to the ARS 110. The asset detection packets include usage data for the asset. The usage data may be, for instance, reports of asset re-use, an asset impact indicator, or any other measure of asset use, re-use, asset value, or other indicator of asset impact within the enterprise, whether expressed in terms of number of projects including the asset, sales volume, sales value, new project efficiencies due to re-use of the asset, or any other metric.

Responsive to the asset detection packets, the asset detection instructions 342 maintain an asset utilization record in the asset manipulation database 332 (420). The asset utilization record captures, as examples, when, where, and how often a previously created asset is used or re-used. The asset utilization record may also capture the value of each use or re-use, e.g., the contract value of the project, device, materials, or other goods and services linked to the asset. As one specific example, an asset utilization record may record that a DDL asset that includes self-driving car intelligence routine, created by asset creator Alex, has been re-used in five different car models, with sales totaling $145,000,000.

The profile modification instructions 344 analyze the asset utilization records and the usage data (422). From the asset utilization records, the profile modification instructions 344 determine a profile update for the specific creator (or joint creators) of a specific asset (424). In the profile database 334, the profile modification instructions 344 create (if none already exists) or update a creator profile record 426. The profile modification instructions 344 dynamically update the creator profile record, e.g., as asset utilization records are updated, to provide a near real-time automated view of creator asset contributions.

The profile visualization instructions 350 receive over the communication interface 302 a profile visualization command 428 (430). The profile visualization command 428 is sent from a profile requester 432 and specifies a selected specific creator. The profile visualization instructions 350 generate a profile visualization 434 in a graphical user interface responsive to the profile visualization command 428 (436). The profile visualization renders a view 438 of the dynamically updated profile record for the specific creator. The profile visualization instructions 350 transmit the profile visualization over the communication interface to the profile requester 432 (440).

Figure 5:
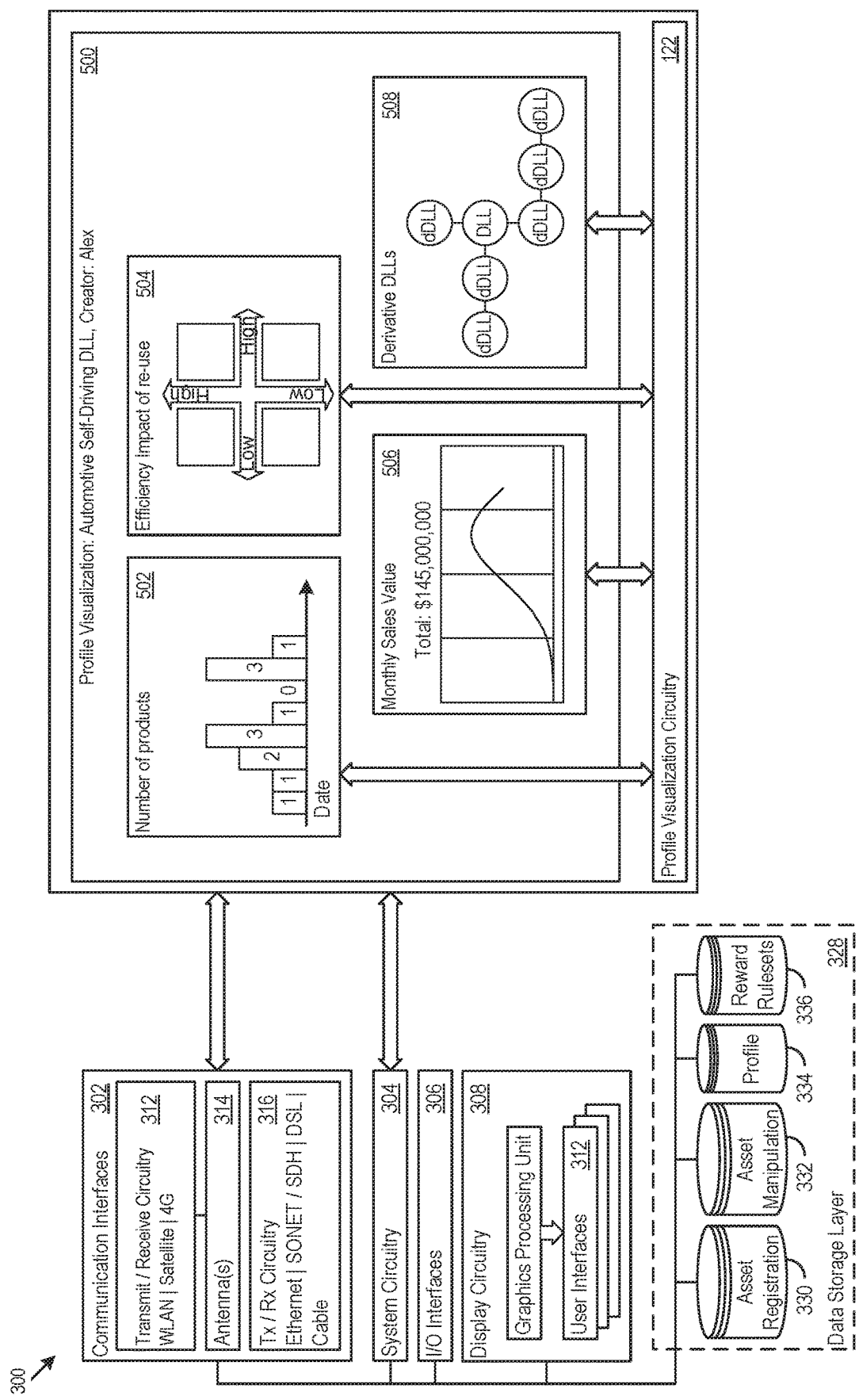
FIG. 5 shows an ARS graphical user interface with profile visualization.

FIG. 5 shows an example profile visualization 500. In this example, the profile visualization conveys information about an automotive self-driving DLL asset created by Alex. The profile visualization 500 includes multiple different visualization components: the number of products component 502, the efficiency component 504, the sales value component 506, and the derivative component 508. The component 502 visualizes the number of products that include the DLL, e.g., the number of automobile models released that incorporate the DLL. The component 504 depicts the efficiency gains realized by re-using the DLL across multiple dimensions, e.g., reduction in engineering time, reduction in product debugging time, or other aspects. The component 506 illustrates the monthly and total sales value of automobiles that include the DLL. The component 508 shows re-used of the DLL (in the center) in derivative DLLs ("dDLLs") created for other vehicles. The visualization components 502-508 are only a few examples of possible visualizations, and a profile visualization may include addition, fewer, or different visualization components.

The specific databases 330-334, control instructions 322, control parameters 326, communication interfaces 302, system circuitry 304, and the structure and content of the generated GUIs 313 improve the functioning of the underlying computer hardware itself. That is, these features (among others described) are specific improvements in way that the underlying computer system operates. The improvements facilitate more efficient, accurate, consistent, and precise registration and tracking of asset use and re-use, as well as building accurate dynamically updated profiles of the work done by asset creators. The improved functioning of the underlying computer hardware itself achieves further technical benefits. For example, the ARS 110 avoids tedious manual processing, reduces the possibility for human error, and therefore increases efficiency in achieving the difficult goals noted above with reduced resource expenditure.

Figure 6:
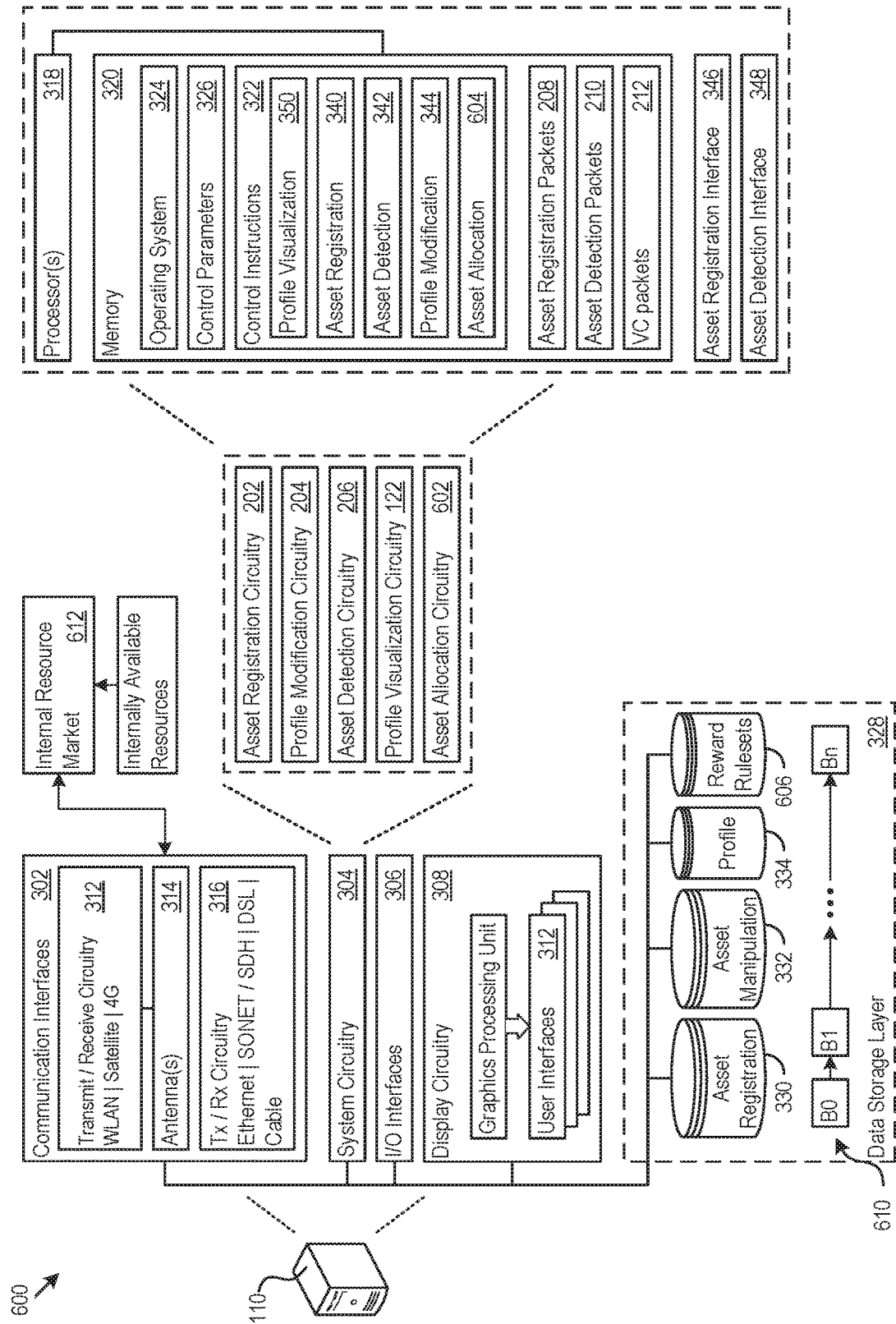
FIG. 6 shows another example implementation of the ARS.

FIG. 6 shows another example implementation 600 of the ARS 110. The implementation 600 includes asset allocation circuitry 602, which may encompass asset allocation instructions 604 in the memory 320, for instance. Note that reward rulesets 606 are pre-defined in the data storage layer 328. The reward rulesets 606 include feedback loop rules that govern, as examples, how and under what conditions to recognize, reward, or compensate a management entity linked to a specific creator of a specific asset.

Figure 7:
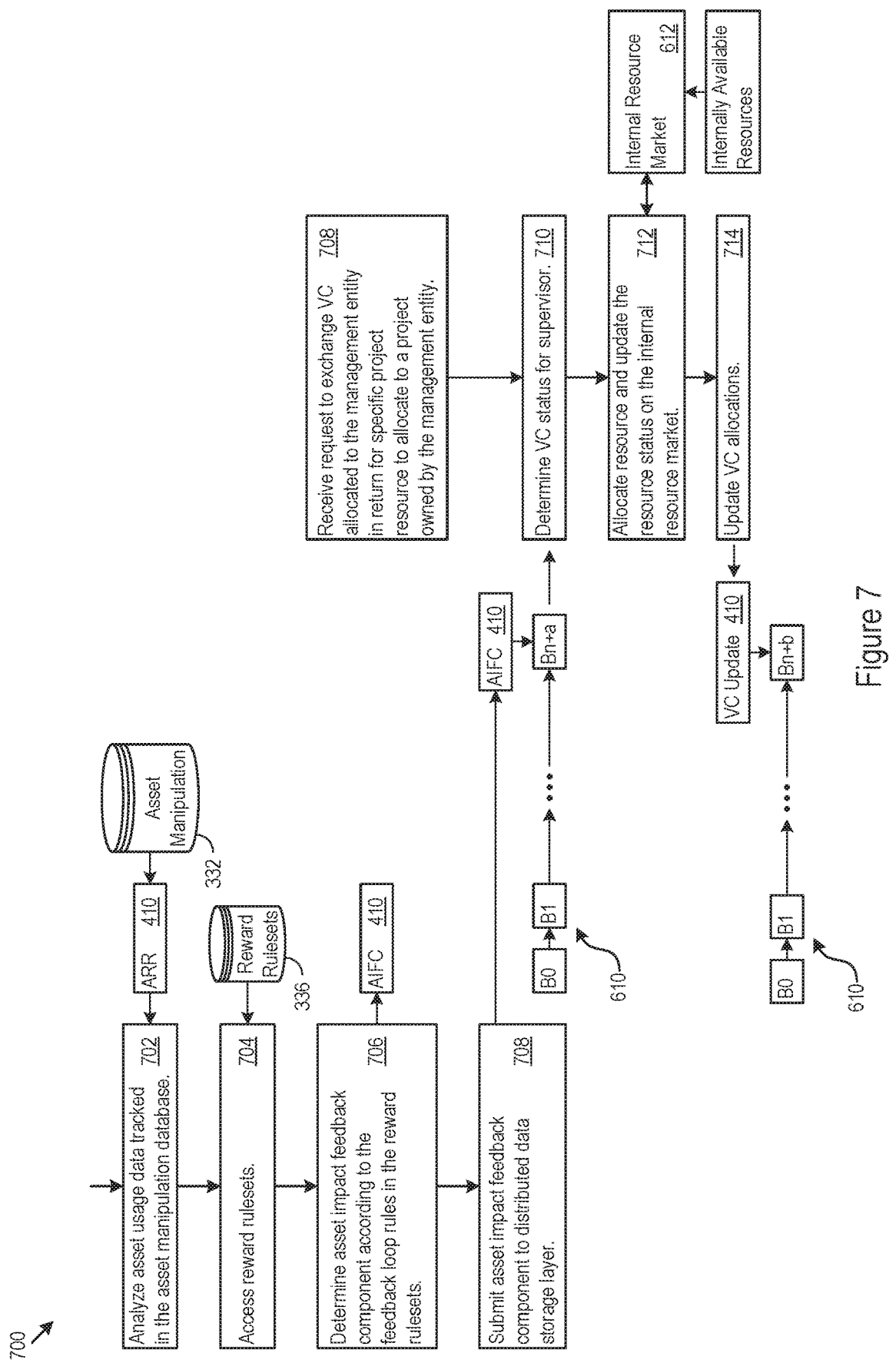
FIG. 7 shows logic that the ARS may implement.

FIG. 6 is discussed in connection with FIG. 7, which shows an example of logic that the asset allocation circuitry 602 may implement. In more detail, the asset allocation instructions 604 analyze the usage data tracked in the asset manipulation database 332 (702) and access the reward rulesets 606 (704). The analysis determines an asset impact feedback component according to the feedback loop rules defined in the reward rulesets 606 (706). In some implementations, the asset impact feedback component is a VC reward, but other feedback components may include cash rewards, internal recognition, vacation days, or other types of rewards. The asset allocation instructions 604 may submit the asset impact feedback component for storage as a new transaction into a secure distributed data storage layer (DDSL) 610. The DDSL 610 may be a private blockchain, for instance, maintained within the enterprise.

The reward rulesets 606 may implement incentives to the managers and supervisors of asset creates to use crowd sourcing. That is, the incentives may drive pre-determined behaviors, including encouraging the supervisor to make asset creators available to other managers or supervisors within the enterprise, e.g., via an internal resource market 612. In that regard, the ARS reward rulesets 606 may be configured to award the supervisor VC to spend, when their crowd sourced asset creator has generated an asset impact measured and tracked in the asset manipulation database 332. The reward rulesets 606 may also create an initial allocation of VC for members of a supervisory group, and make periodic allocations of additional VC to the members of the supervisory group independently of crowd sourcing. Expressed another way, the ARS 110 rewards group members with VC as a result of making their asset creators available to other group members. The reward rulesets 606 may specify a specific amount of VC, e.g., per hour or per project. In other implementations, the reward rulesets 606 may reward VC responsive to the asset impact, and as the asset impact grows (for instance) the reward rulesets 606 may reward additional VC.

The ARS 110 also accepts requests to exchange VC allocated to the management entity in return for a specific project resource available on the internal resource market 612 (708). The resource may, for instance, by needed on a project owned by the management entity (708) for which the management entity has no suitable regularly assigned resource. In that respect, the ARS 110 may limit the redemption of the VC by one manager to purchasing resources from other managers. That is, the ARS 110 need not support converting the VC into traditional government issued currency, or exchanging or redeeming the VC for goods and services in general. In support of the request, the ARS 110 determines the VC status of the requester (710), e.g., by querying the DDSL 610. If sufficient VC exists, then the ARS 110 may allocate the resource to the requester and update the resource status on the internal resource market 612 (712). The ARS 110 also issues a VC allocation update, e.g., for submission to the DDSL 610 according to the VC cost for the resource (714).

The methods, devices, processing, circuitry, and logic of the navigation system described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The ARS 110 may implement the logic shown in FIGS. 5 and 7 in any combination of the control instructions 322, control parameters 326, operating system 324 or circuitry 122, 202, 204, 206 and 602. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and controlled, may be incorporated into a single memory or database, may be logically and physically organized in many different ways, and may be implemented in many different ways. In other implementations, any of the databases may be part of a single database structure, and, more generally, may be implemented logically or physically in many different ways. Each of the databases defines tables storing records that the control instructions read, write, delete, and modify to perform the processing noted below. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

In one specific implementation, the ARS 110 provides incentives to managers to use crowd sourcing, e.g., to make managed resources available to others within the enterprise, e.g., on in internal talent market. In that regard, the ARS 110 reward rulesets may be configured to award the supervisor VC to spend, when their crowd sourced resource has generated an asset impact within the enterprise. In that regard, the ARS 110 may create an initial allocation of VC for members of a management group. The ARS 110 rewards group members with VC as a result of making their resources available to other group members.

The reward rulesets 606 may specify a specific amount of VC, e.g., per hour or per project. In other implementations, the reward rulesets 606 may reward VC responsive to the asset impact, and as the asset impact grows (for instance) the ARS 110 rewards additional VC. The ARS 110 may limit the redemption of the VC by one manager to purchasing resources from other managers. That is, the ARS 110 need not support converting the VC into traditional dollars, or exchanging or redeeming the VC for goods and services in general.

In this type of implementation, the ARS 110 also creates and dynamically updates asset creator profiles, effectively creating a live portfolio of work done and contributions made by the asset creators. As explained above, the ARS 110 may track the asset impact for any asset, and update the live portfolio to show the continuing contribution of that asset to the enterprise. For instance, each sale of a library function, or each re-use of the library function in a new project, may be tracked and added to the live portfolio according to the contributions of one or more asset creators. In this way, the ARS 110 more efficiently tracks asset impact, with fewer errors, and with less manual intervention.

Various implementations have been specifically described. However, many other implementations are also possible.

What is claimed is:
1. A system comprising:
a physical layer communication interface;
an asset registration database;
an asset manipulation database;
asset registration system circuitry coupled to the physical layer communication interface, the asset registration system circuitry including:
asset registration circuitry configured to:
implement an asset registration interface over the physical layer communication interface;
receive an asset registration packet through the asset registration interface, the asset registration packet comprising an asset identifier of a specific asset and a creator identifier of a specific creator of the specific asset; and
in the asset registration database, provide an asset registration record for the specific asset, the asset registration record including the asset identifier and the creator identifier; and
asset detection circuitry configured to:
implement an asset detection interface over the physical layer communication interface;
receive, from an asset use monitor, an asset detection packet through the asset detection interface, the asset detection packet comprising usage data for the specific asset, wherein the asset use monitor is configured to detect a use of the specific asset; and
in the asset manipulation database, provide an asset utilization record updated with the usage data for the specific asset in response to the detection of the use of the specific asset by the asset use monitor;
a profile database;
profile modification circuitry configured to:
analyze the usage data to determine a profile update for the specific creator; and
in the profile database, provide a profile record for the specific creator, dynamically updated responsive to the profile update; and
profile visualization circuitry configured to:
receive from a profile requester, over the communication interface, a profile visualization command specifying the specific creator;
generate a profile visualization in a graphical user interface responsive to the profile visualization command, the profile visualization comprising a number of products utilizing the specific asset, efficiency gains realized by reusing the specific asset, a monetary value of the products utilizing the specific asset, and a derivative use of the specific asset; and
transmit the profile visualization over the communication interface to the profile requester.

2. The system of claim 1, where:
the asset registration interface is configured to accept a registration connection from an external asset creation application.

3. The system of claim 1, where:
the asset identifier comprises a metadata tag linked to the specific asset.

4. The system of claim 1, where:
the usage data in the asset detection packet comprises an asset re-use indicator of the specific asset.

5. The system of claim 1, where:
the usage data in the asset detection packet comprises an asset impact indicator of the specific asset.

6. The system of claim 1, further comprising:
a reward ruleset; and
asset allocation circuitry configured to:
access the reward ruleset;
analyze the usage data against the reward ruleset to determine an asset impact feedback component; and allocate the asset impact feedback component to a predetermined entity.

7. The system of claim 6, where:
the predetermined entity is a management entity linked to the specific creator; and
the asset impact component feedback comprises a virtual currency reward.

8. The system of claim 1, where:
the asset registration record further comprises a creation date and time of the specific asset, a creation location of the specific asset, and creation characteristics of the specific asset.

9. The system of claim 1, wherein the profile modification circuitry further configured to:
update the profile of the specific creator corresponding to the updated asset utilization record to provide a real-time automated view of asset contributions of the specific creator.

10. A method comprising:
providing a physical layer communication interface;
providing an asset registration database;
providing an asset manipulation database;
providing asset registration system circuitry coupled to the physical layer communication interface, the asset registration system circuitry including asset registration circuitry and asset detection circuitry;
with the asset registration circuitry:
  implementing an asset registration interface over the physical layer communication interface;
  receiving an asset registration packet through the asset registration interface, the asset registration packet comprising an asset identifier of a specific asset and an creator identifier of a specific creator of the specific asset; and
  in the asset registration database, providing an asset registration record for the specific asset, the asset registration record including the asset identifier and the creator identifier;
with the asset detection circuitry:
  implementing an asset detection interface over the physical layer communication interface;
  receiving, from an asset use monitor, an asset detection packet through the asset detection interface, the asset detection packet comprising usage data for the specific asset, wherein the asset use monitor is configured to detect a use of the specific asset; and
  in the asset manipulation database, providing an asset utilization record updated with the usage data for the specific asset in response to the detection of the use of the specific asset by the asset use monitor;
providing a profile database;
with profile modification circuitry:
  analyzing the usage data to determine a profile update for the specific creator; and
  in the profile database, providing a profile record for the specific creator, dynamically updated responsive to the profile update; and
with profile visualization circuitry:
  receiving from a profile requester, over the communication interface, a profile visualization command specifying the specific creator;
  generating a profile visualization in a graphical user interface responsive to the profile visualization command, the profile visualization comprising a number of products utilizing the specific asset, efficiency gains realized by reusing the specific asset, a monetary value of the products utilizing the specific asset, and a derivative use of the specific asset; and
  transmitting the profile visualization over the communication interface to the profile requester.

11. The method of claim 10, further comprising:
accepting, through the asset registration interface, a registration connection from an external asset creation application.

12. The method of claim 10, where:
the asset identifier comprises a metadata tag linked to the specific asset.

13. The method of claim 10, where:
the usage data in the asset detection packet comprises an asset re-use indicator of the specific asset.

14. The method of claim 10, where:
the usage data in the asset detection packet comprises an asset impact indicator of the specific asset.

15. The method of claim 10, further comprising:
providing a reward ruleset; and
with asset allocation circuitry:
accessing the reward ruleset;
analyzing the usage data against the reward ruleset to determine an asset impact feedback component; and
allocating the asset impact feedback component to a predetermined entity.

16. The method of claim 15, where:
the predetermined entity is a management entity of the specific creator; and
the asset impact component comprises a virtual currency reward.

17. The method of claim 10, where:
the asset registration record further comprises a creation date and time of the specific asset, a creation location of the specific asset, and creation characteristics of the specific asset.

18. The method of claim 10, further comprising:
updating, by the profile modification circuitry, the profile of the specific creator corresponding to the updated asset utilization record to provide a real-time automated view of asset contributions of the specific creator.

19. A system comprising:
a physical layer communication interface;
an asset registration database;
a profile database;
an asset manipulation database; and
asset registration system circuitry coupled to the physical layer communication interface, the asset registration system circuitry including:
asset registration circuitry configured to:
  implement an asset registration interface over the physical layer communication interface;
  accept a registration connection from an external asset creation application through the asset registration interface;
  receive an asset registration packet through the registration connection, the asset registration packet comprising an asset identifier of a specific asset and an creator identifier of a specific creator of the specific asset; and
  in the asset registration database, provide an asset registration record for the specific asset, the asset registration record including the asset identifier and the creator identifier;
asset detection circuitry configured to:
  implement an asset detection interface over the physical layer communication interface;

receive, from an asset use monitor, an asset detection packet through the asset detection interface, the asset detection packet comprising an impact indicator for the specific asset, wherein the asset use monitor is configured to detect a use of the specific asset; and in the asset manipulation database, provide an asset utilization record updated according to the impact indicator for the specific asset in response to the detection of the use of the specific asset by the asset use monitor;

profile modification circuitry configured to:
analyze the impact indicator to determine a profile update for the specific creator; and
in the profile database, provide a profile record for the specific creator, dynamically updated responsive to the profile update; and profile visualization circuitry configured to:
receive from a profile requester, over the communication interface, a profile visualization command specifying the specific creator;
generate a profile visualization in a graphical user interface responsive to the profile visualization command, the profile visualization comprising a number of products utilizing the specific asset, efficiency gains realized by reusing the specific asset, a monetary value of the products utilizing the specific asset, and a derivative use of the specific asset; and
transmit the profile visualization over the communication interface to the profile requester.

20. The system of claim 19, further comprising:
a reward ruleset; and
asset allocation circuitry configured to:
access the reward ruleset;
analyze the impact indicator against the reward ruleset to determine a virtual currency reward;
allocate the virtual currency reward to a management entity of the specific creator; and
accept a request to exchange virtual currency allocated to the management entity in return for a specific project resource to allocate to a project owned by the management entity.

* * * * *